(12) United States Patent
Itonori (10) Patent No.: US 8,280,175 B2
(45) Date of Patent: Oct. 2, 2012

(54) DOCUMENT PROCESSING APPARATUS, DOCUMENT PROCESSING METHOD, AND COMPUTER READABLE MEDIUM

(75) Inventor: Katsuhiko Itonori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 899 days.

(21) Appl. No.: 12/372,500

(22) Filed: Feb. 17, 2009

(65) Prior Publication Data

US 2010/0054599 A1 Mar. 4, 2010

(30) Foreign Application Priority Data

Aug. 26, 2008 (JP) ................................. 2008-216184

(51) Int. Cl.
 G06K 9/62 (2006.01)
 G06K 9/00 (2006.01)
 G06K 9/18 (2006.01)
 G06K 9/72 (2006.01)
(52) U.S. Cl. ........ 382/224; 382/181; 382/185; 382/186; 382/187; 382/229; 382/231
(58) Field of Classification Search .................. 382/182, 382/185–189, 181, 224, 229, 231
See application file for complete search history.

(56) References Cited

U.S. PATENT DOCUMENTS 6,069,978 A * 5/2000 Peairs ........................... 382/254
7,519,221 B1 * 4/2009 Nicholson ..................... 382/181
7,558,426 B2 * 7/2009 Katoh et al. ................... 382/225
2008/0063279 A1 * 3/2008 Vincent et al. ................ 382/182

FOREIGN PATENT DOCUMENTS

| JP | 06-119484 A | 4/1994 |
| JP | 06-259595 A | 9/1994 |
| JP | 08-305804 A | 11/1996 |
| JP | 09-185674 A | 7/1997 |
| JP | 11-213087 A | 8/1999 |
| JP | 2003-099709 A | 4/2003 |
| JP | 2007-179307 A | 12/2007 |

OTHER PUBLICATIONS

Japanese Office Action issued on Sep. 14, 2010 in the corresponding Japanese Patent Application No. 2008-216184.

* cited by examiner

Primary Examiner — Anand Bhatnagar
Assistant Examiner — Soo Park
(74) Attorney, Agent, or Firm — Sughrue Mion, PLLC (57) ABSTRACT

A document processing apparatus includes: a character segmentation unit that segment a plurality of character images from a document image; a character image classifying unit that classifies the character images to categories corresponding to each of the character images; an average character image obtaining unit that obtains average character images for each of the categories of the character images classified by the character image classifying unit; a character recognizing unit that performs a character recognition to a character contained in each of the average character images; and an output unit that outputs character discriminating information as a character recognition result obtained by the character recognizing unit.

10 Claims, 13 Drawing Sheets

FIG. 1

SYSTEM CONFIGURATION DIAGRAM OF FIRST EMBODIMENT

FIG. 2
FUNCTIONAL BLOCK DIAGRAM OF FIRST EMBODIMENT

FIG. 3
FLOWCHART OF EXAMPLE OF RECOGNITION OPERATION

FIG. 4
DIAGRAM EXPLAINING CONNECTED COMPONENTS

FIG. 5
DIAGRAM EXPLAINING CHARACTER SEGMENTATION OPERATION

FIG. 6

DIAGRAM EXPLAINING CHARACTER IMAGE MANAGEMENT DATA

FIG. 7

DIAGRAM EXPLAINING CHARACTER IMAGE MANAGEMENT DATA AFTER DETERMINING CATEGORY

FIG. 8

DIAGRAM EXPLAINING CHARACTER RECOGNITION RESULT MANAGEMENT DATA

FIG. 11
FLOWCHART FOR CORRECTING RECOGNITION RESULT

FIG. 12

CORRECTION OF CHARACTER RECOGNITION RESULT

FIG. 13

EXAMPLES OF INPUT IMAGES

FIG. 14

EXAMPLE OF CHARACTER IMAGE MANAGEMENT DATA

⋮

CHARACTER IMAGE: 0xdddddddd
IMAGE NO.: 1, POSITION: 102
CATEGORY NO.: 397

CHARACTER IMAGE: 0xdddddd50
IMAGE NO.: 2, POSITION: 94
CATEGORY NO.: 397

CHARACTER IMAGE: 0xdddd1ab50
IMAGE NO.: 3, POSITION: 173
CATEGORY NO.: 397

EXAMPLE OF CHARACTER RECOGNITION
RESULT MANAGEMENT DATA

```
⋮
CATEGORY NO.: 57
CATEGORY CODE: 際
⋮
CATEGORY NO.: 397
CATEGORY CODE: 困
⋮
```

FIG. 16

EXAMPLE OF RECOGNITION RESULT

EXAMPLE OF CORRECTING FIRST RECOGNITION RESULT

EXAMPLE OF CORRECTING CHARACTER RECOGNITION RESULT MANAGEMENT DATA

```
⋮
CATEGORY NO.: 57
CATEGORY CODE: 際
⋮
CATEGORY NO.: 397
CATEGORY CODE: 国
⋮
```

FIG. 19

EXAMPLE OF CORRECTING RECOGNITION RESULT

…困際空港の開港に…

…特別困会会期中での…

…は、困立図書館の…

DOCUMENT PROCESSING APPARATUS, DOCUMENT PROCESSING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-216184 filed Aug. 26, 2008.

BACKGROUND

1. Technical Field

The present invention relates to a document processing apparatus, a document processing method, and a computer readable medium.

2. Related Art

A character recognition apparatus has been utilized widely in order to automatically extract document information from a document image and register the extracted information in a database etc. However, it is impossible to desire the character recognition apparatus to recognize characters with a character recognition ratio of 100% and so a correction procedure is required. In the related art, it is premised that document images are processed on a single-sheet unit basis, so that in the case of processing document images of plural sheets, it is required to confirm the respective pages and then perform the correction procedure.

A recent image input apparatus tends to increasingly mount an automatic document feeder (ADF) compromising that many documents are read. When many document images are read by using such the apparatus, the document image is sometimes inclined or distorted at every image. In this case, although the image is corrected by using the image correction technique etc., the same character is not necessarily corrected in the same character in an image level. Thus, the same character is sometimes recognized as different characters. In the technique of related art, since character images are collected based on the character recognition results, there arise a case that different corrected characters are proposed with respect to a single character.

SUMMARY

According to an aspect of the present invention, a document processing apparatus includes: a character segmentation unit that segments a plurality of character images from a document image; a character image classifying unit that classifies the character images to categories corresponding to each of the character images; an average character image obtaining unit that obtains average character images for each of the categories of the character images classified by the character image classifying unit; a character recognizing unit that performs a character recognition to a character contained in each of the average character images; and an output unit that outputs character discriminating information as a character recognition result obtained by the character recognizing unit.

BRIEF DESCRIPTION OF THE DRAWINGS

Exemplary embodiment of the present invention will be described in detail based on the following figures, wherein.

DETAILED DESCRIPTION

Embodiments of the invention will be explained.

(Embodiment 1)

Figure 1:
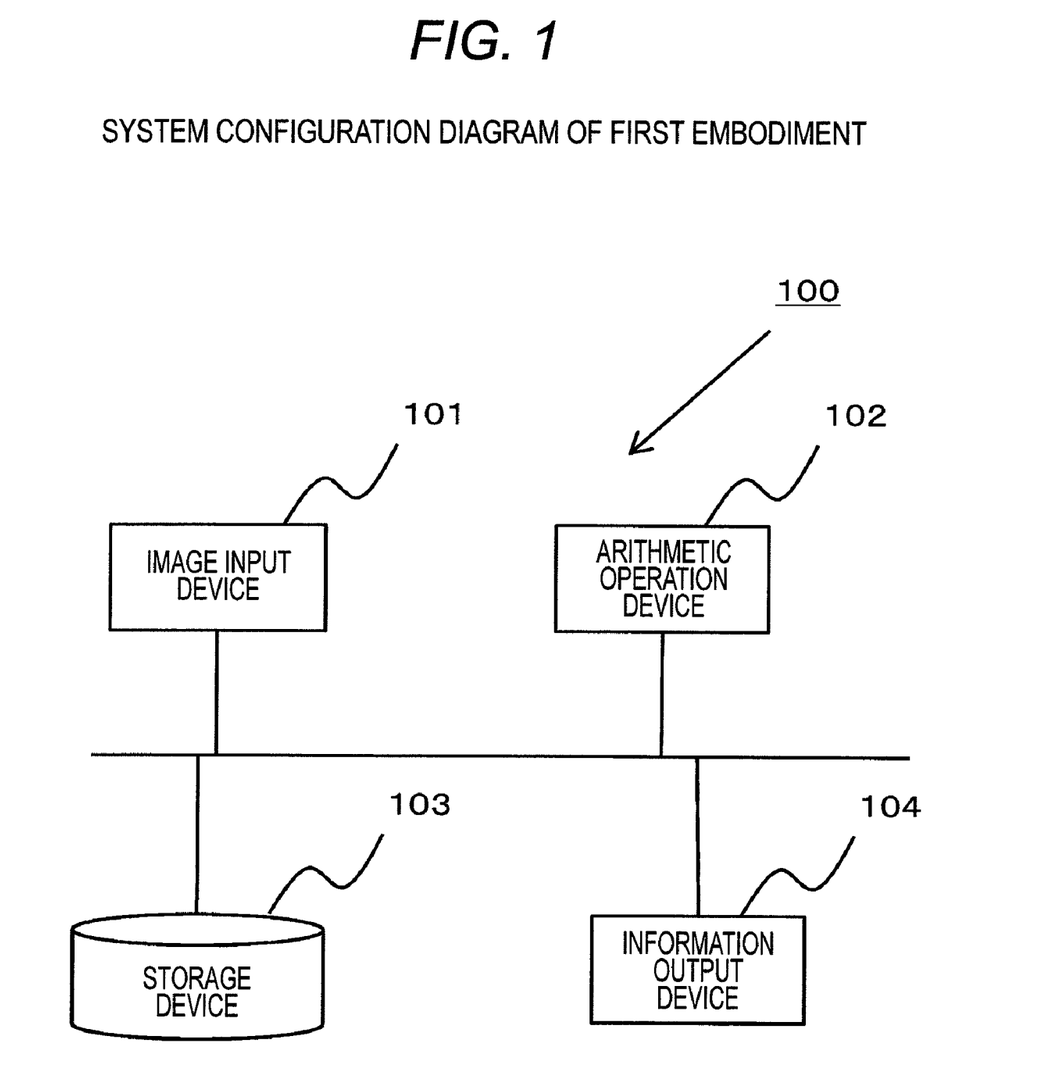
FIG. 1 is a block diagram showing the system configuration according to the first embodiment of the invention.

FIG. 1 shows the entire configuration of an image processing apparatus 100 according to the first embodiment of the invention.

Figure 2:
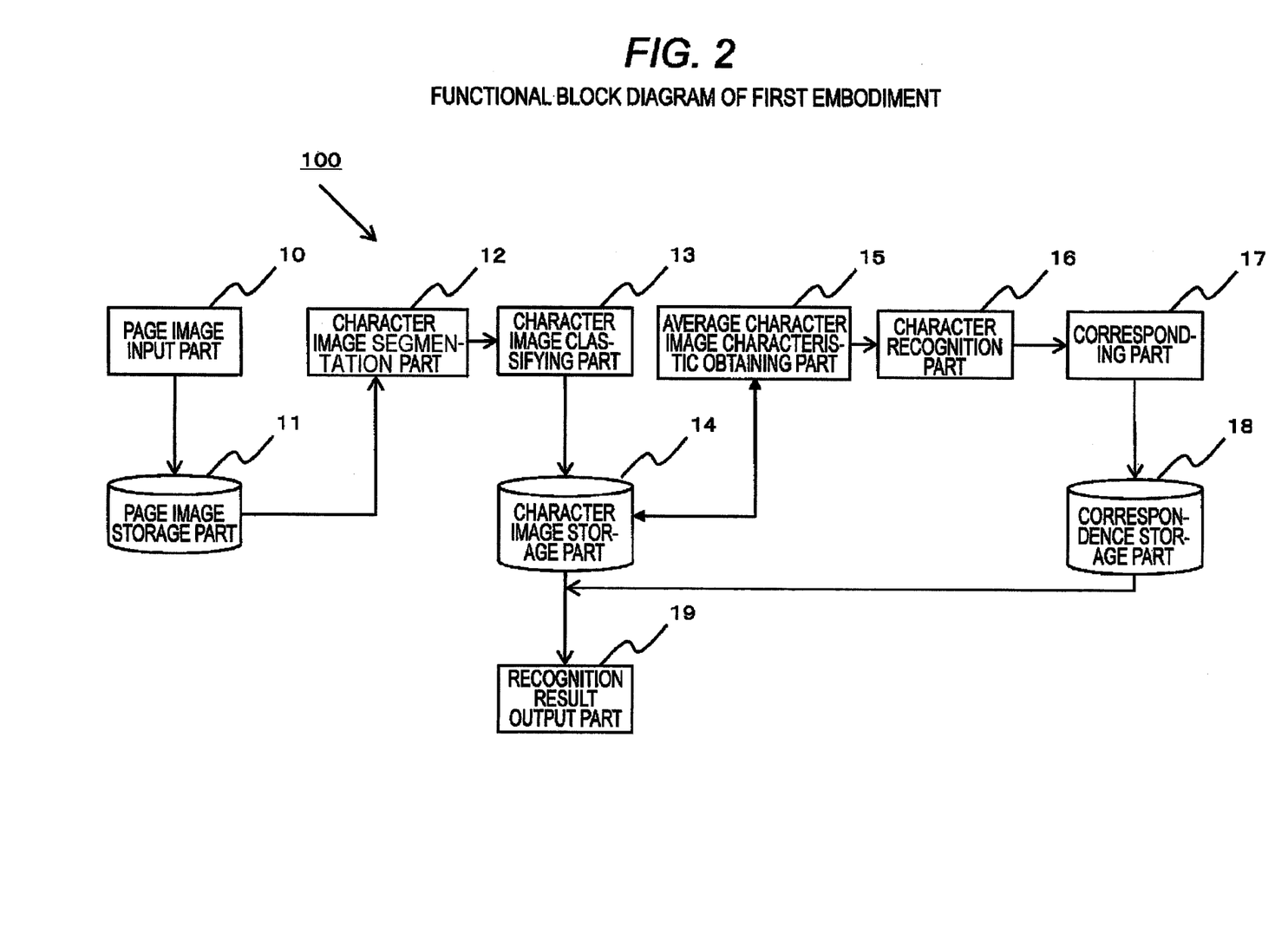
FIG. 2 is a block diagram showing the functional configuration of the main portion of the first embodiment.
Figure 3:
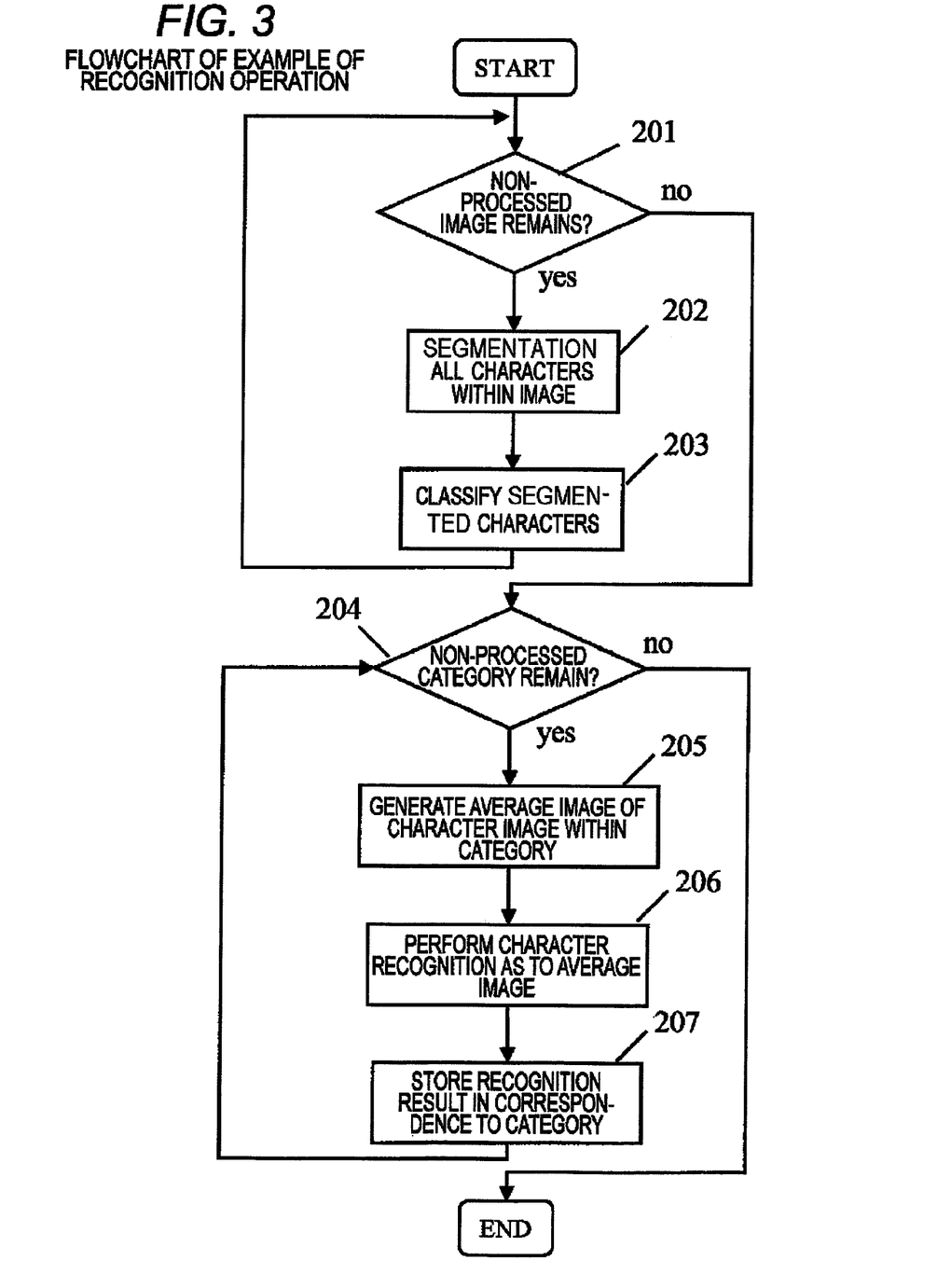
FIG. 3 is a flowchart for explaining an example of the operation of the first embodiment.

FIG. 2 shows the functional block diagram of the main portion of the image processing apparatus 100. FIG. 3 shows an example of a character recognition operation. The image processing apparatus 100 may be mounted on a computer system or mounted on a plurality of computer systems which are coupled from one another via a communication network. The respective functional blocks shown in FIG. 2 are realized by cooperating hardware resources and software resources in the computer system shown in FIG. 1. The software is installed in the computer system via various kinds of recording medium or a communication means.

In FIG. 1, 101 depicts an image input device mounting an automatic document feeder (also called an ADF), 102 an arithmetic operation device (CPU) for executing various kinds of image processings, a character recognition processing and other necessary processings, 103 a storage device for temporarily storing image information inputted at the image input device 101, programs necessary for the execution and processing results, and 104 an information output device for outputting the processing results.

In FIG. 2, the image processing apparatus 100 is configured to include a page image input part 10, a page image storage part 11, a character image segmentation part 12, a character image classifying part 13, a character image storage part 14, an average character image characteristic obtaining part 15, a character recognition part 16, a corresponding part 17, a correspondence storage part 18 and a recognition result output part 19, etc.

The page image input part 10 receives images of page unit basis from the image input device 101 (FIG. 1) and stores in the page image storage part 11. The character image segmentation part 12 extracts a page image, that is, an image of one page or a part thereof from the page image storage part 11 and segments a character image. The character image is typically an image including one character but may be an image formed by coupling two or more character images. The character image is typically segmentation by a rectangular area etc. The character image classifying part 13 classifies the character images into a plurality of character image clusters. Templates are defined with respect to the character images, respectively, whereby each of the character images is collated with the templates and so classified into a corresponding one of the clusters. Data of the respective character images is stored in the character image storage part 14. The configuration of the data of the character image will be explained later in detail.

The average character image characteristic obtaining part 15 extracts, as to each of the clusters, an average character image characteristic amount of the character images belong to the cluster. An example of the extracting method will be explained later in detail. The character recognition part 16 performs the character recognition at every cluster by using the average character image characteristic amount. The corresponding part 17 stores the cluster and the character recognition result in a corresponding manner in the correspondence storage part 18.

The recognition result output part 19 reads data of the respective character images from the character image storage part 14 and also reads the correspondence between the clusters and the character recognition results from the correspondence storage part 18 to thereby output the character recognition result at every page image. The data of the character image typically includes a page, the position within the page, a cluster, a character image. The corresponding document data is generated from the cluster and the character recognition result (character code). The document data is presented to a user by the information output device 104 (FIG. 1).

Next, an example of the operation of the embodiment will be explained mainly with reference to a flowchart shown in FIG. 3.

Figure 4:
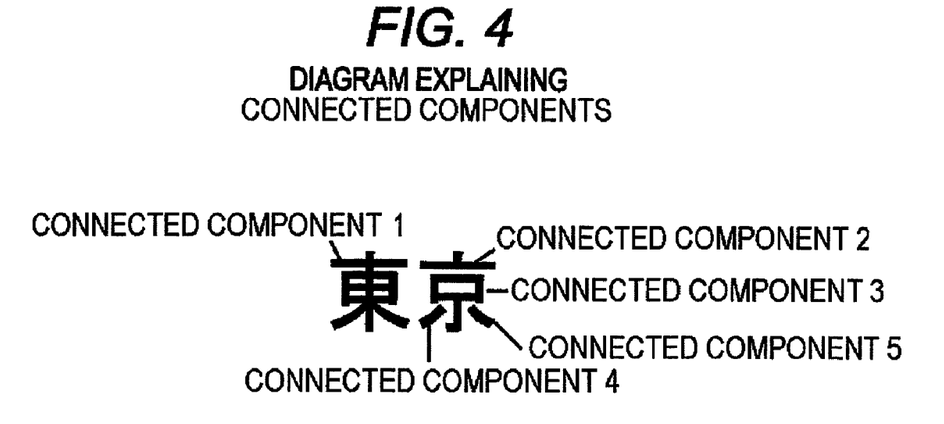
FIG. 4 is a diagram for explaining connected components in the first embodiment.

A document placed on the automatic document feeder of the image input device 101 is read and stored in the storage device 103 (page image storage part 11). The character image segmentation part 12 reads the images thus stored on the one sheet unit basis (201) and segments all characters of the image (202). The character segmentation can be realized by extracting connected components (FIG. 4) in the image and extracting the connected component(s) within a rectangle of a predetermined size.

In this case, if the characters are Japanese characters, the characters can be segmented correctly by defining the rectangle as a square. In the case where English characters are mixed in a document of Japanese, if the document image is segmented by using the square, plural characters may be contained in the square. However, in this embodiment, a combination of plural characters segment by the square is treated as one character. In this case, of course, the character recognition processing of the succeeding stage employs a dictionary configuration so that the character recognition can be performed even in the case of the combination of plural characters.

Figure 5:
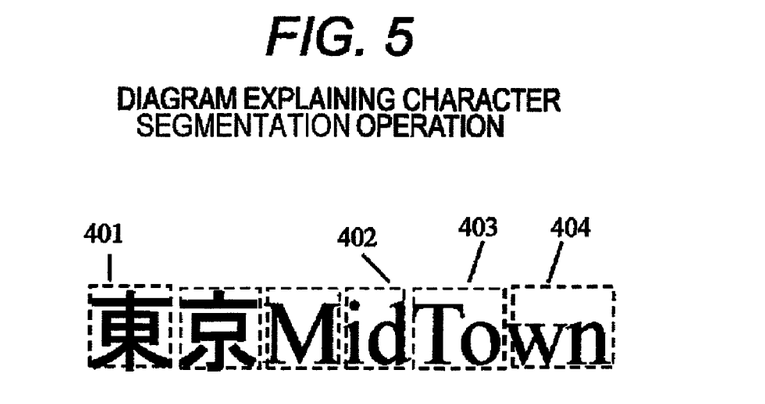
FIG. 5 is a diagram for explaining the segmentation operation of character images in the first embodiment.

This processing will be explained as to "東京Mid Town (Chinese characters "東京"mean "Tokyo" in English)" as an example shown in FIG. 5. A rectangle shown by a reference numeral 401 is supposed as the rectangle of one character. Supposing that characters of the same size are aligned on the same line, the connected components which upper side positions are almost same are found, and a rectangle which one side is same as the maximum height of these connected components can be formed. Since the character "東(this Chinese character means "east" in English)" has almost the same size as the supposed rectangle 401, this character is segmented with the size of the rectangle. Since each of the characters from "東"to "M" has almost the same size as the supposed rectangle 401, each of these characters is segmented with the size of the rectangle. When the rectangle 401 is moved to the next characters, this rectangle 401 includes the characters "id" and a part of the character "T". Thus, the rectangle 401 is deformed so as not to include the character "T" into a rectangle 402 and then the characters are segmented by this deformed rectangle. Hereinafter, in the similar manner, the succeeding characters are segmented by rectangles 403 and 404. As a result, images including the segmented characters "id", "To" and "wn" are obtained. The segmented images are recorded in the character image storage part 14 as character image management data.

Figure 6:
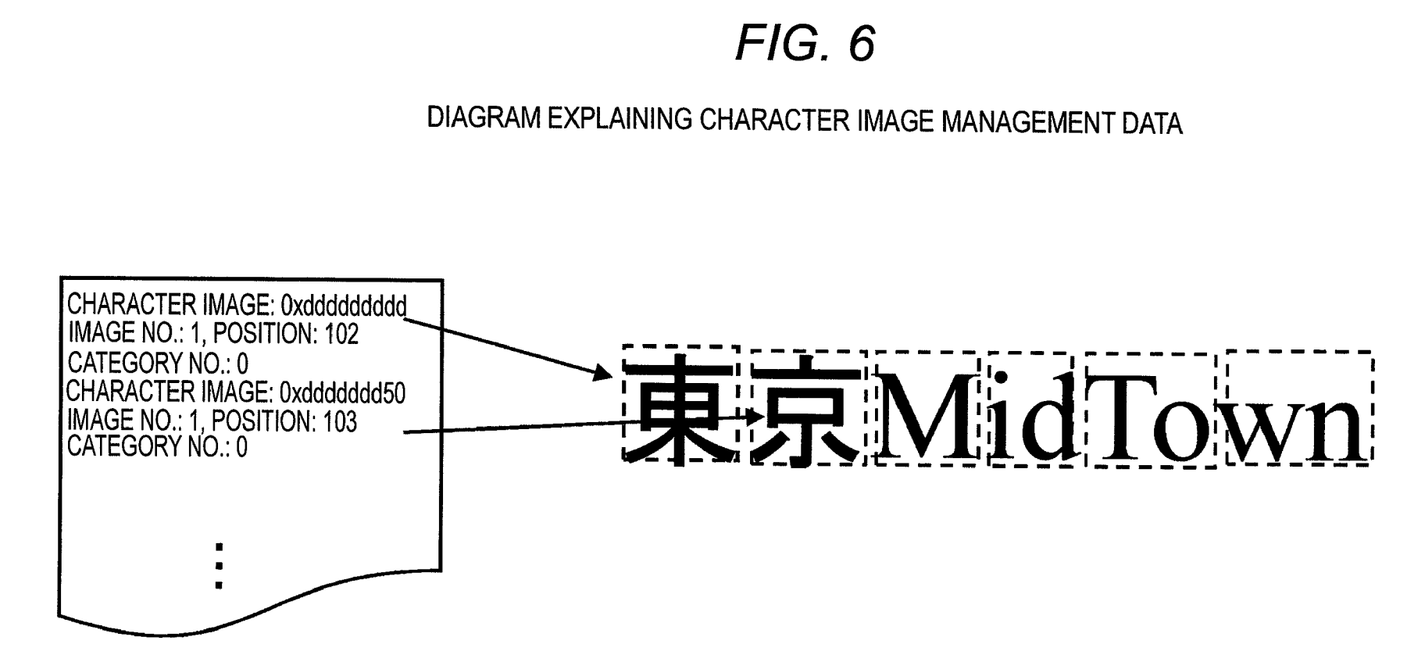
FIG. 6 is a diagram for explaining the character image management data (category is not determined yet) in the first embodiment.

As shown in FIG. 6, the character image management data is configured by address information representing the position of an image, an image No. (No. of a page image), the position of the segmented image, and a category No. At this time, the category No. is null (for example, 0 is inputted as a temporary value). As the image Nos., numbers sequentially added to inputted images at the image input device 101 are stored. As the position of a segmented image, a number representing the position of the image within a document image is stored. This value may be the coordinate information of a segmented image (a coordinate of upper left coordinate of the segmented image).

Figure 7:
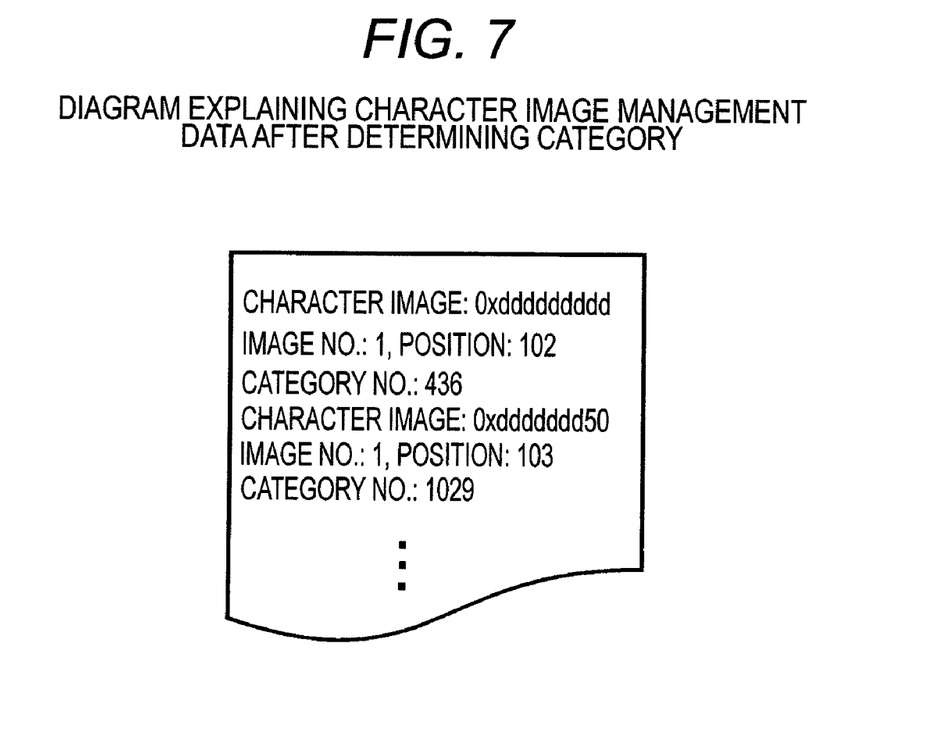
FIG. 7 is a diagram for explaining the character image management data (category has been determined) in the first embodiment.

Next, the character image classifying part 13 classifies the segmented character (203). The classification is made in a manner that a segmented image is compared with the images within the respective categories and the segmented image is classified to the most similar category. When there is not a proper category to which the segmented image is to be classified, a new category is added. The comparison is performed in a manner that categories of all characters and representative images of the respective characters are prepared, then a difference between segmented image and each of the representative images of the respective characters is obtained, and the segmented image is classified to the category having the minimum difference. The difference is obtained by counting the number of pixels being not common when the segmented image is overlapped with the representative image of the character. Alternatively, the categories may not be prepared in advance, and category may be provided newly when the difference is not within a predetermined value in the case comparing with the representative character of existing category. The representative character in this case may be determined as an image firstly classified to the category. When the category of the segmented image is determined, the category is recorded as the category No. in the character image management data stored in the character image storage part 14. Although the category is determined based on a difference between images, the category may be determined by comparing characteristic amounts of images. When the aforesaid segmentation and categorizing processing of the characters are completed, it is checked whether or not there remains any image having not been processed yet in the storage device 103. When the aforesaid processing are performed as to all the images, the process proceeds to a next processing (204). The representative image of each category may be updated each time new character image is added to the category. As to a character species expected to appear, it is preferable to prepare a category and a representative image in advance. In this case, however, in the initial state, a character code is not made correspond to a category decisively. The character recognition is made finally based on the average image characteristics of all the character images respectively classified to the categories, and the character code as the result of the character recognition is allocated to the category. Of course, the categories may be initialized in the initial state and new category may be added each time there arises a character image having a large difference.

The character image management data stored in the character image storage part 14 is checked and character image information of the same category No. is collected. The pixel values of the collected images are summed at each pixel position to obtain the average value of each of the pixel positions. The average values thus obtained are subjected to a threshold value processing by using a constant threshold value to obtain an average image (average character image characteristics) (205).

Figure 8:
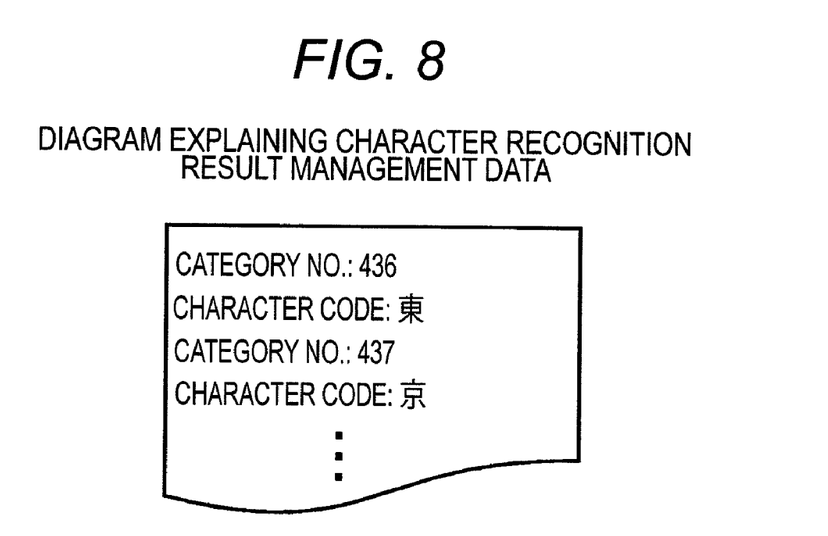
FIG. 8 is a diagram for explaining the character recognition result management data in the first embodiment.

The character recognition part 16 subjects the average image thus obtained to the character recognition processing to obtain a character code to thereby determine the character species of the category (206). The category information and the character species (character code) thus determined is recorded in the device 10 (correspondence storage part 18) as character recognition result management data by the corresponding part 17 (207). As shown in FIG. 8, the character recognition result management data is configured pairs of the category Nos. and the character recognition results. In this case, the character recognition result may include a candidate character of the character recognition result. At the time of character segmentation, since there is a case that a plurality (two) of English characters are segmented simultaneously, it is necessary to prepare a dictionary which can recognize two characters as a single character, as a dictionary for the character recognition.

The aforesaid recognition processing is executed as to all the categories to thereby determine characters for each category. The recognition result output part 19 outputs the character code corresponding to the category No. based on the image No. and the character position information stored in the character image management data, whereby the character recognition result can be obtained for each input image. The character recognition result is presented by the information output device 104.

(Embodiment 2)

Next, the image processing apparatus according to a second embodiment of the invention will be explained. According to the image processing apparatus of the first embodiment, when the classification of the category is erroneous, different characters are mixed within a category, whereby the character recognition result contains error. The second embodiment provides a measure for dealing with such the error.

Figure 9:
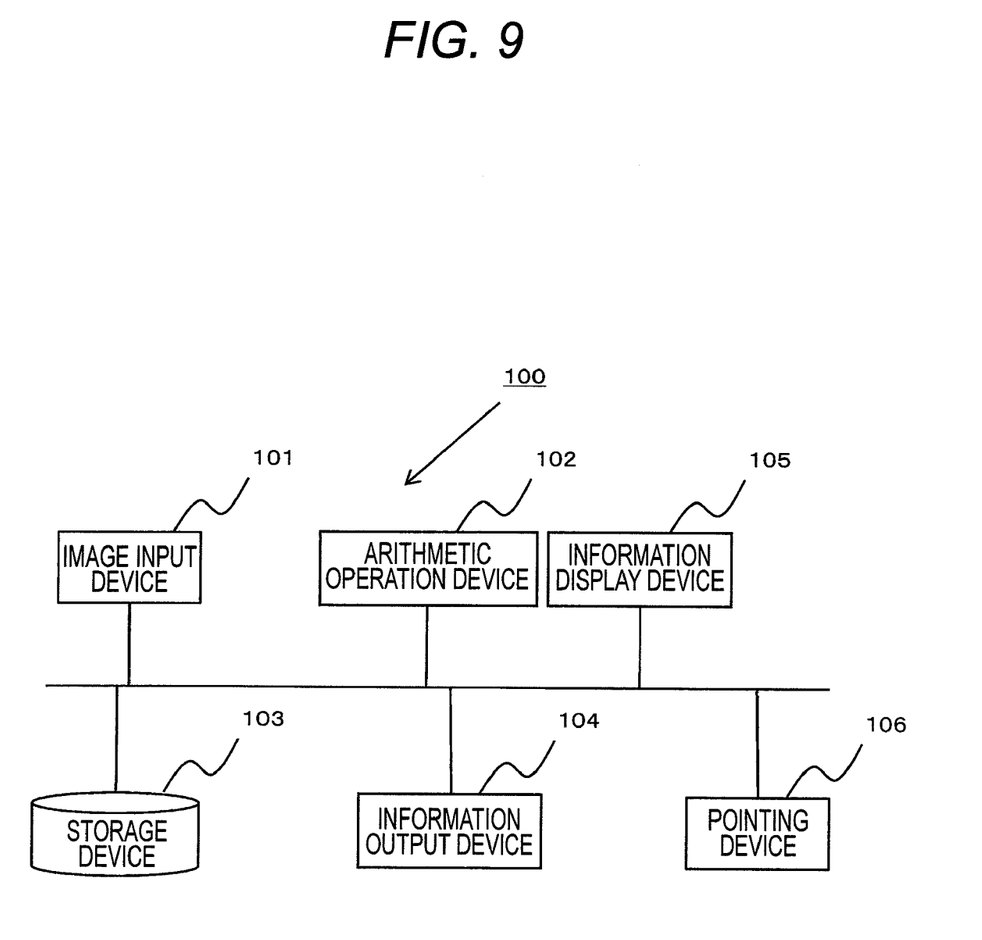
FIG. 9 is a block diagram showing the system configuration according to the second embodiment of the invention.
Figure 10:
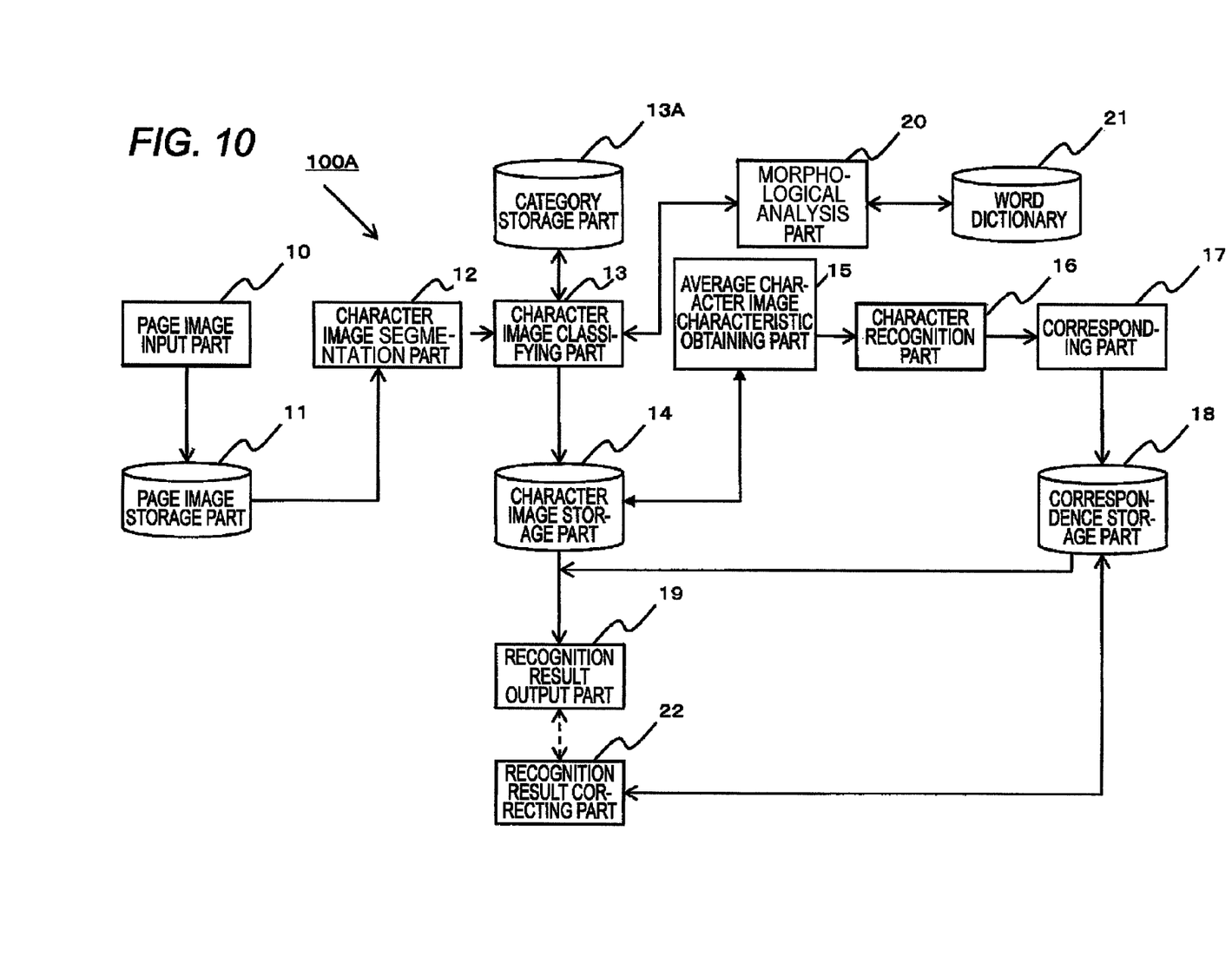
FIG. 10 is a block diagram showing the functional configuration of the main portion of the second embodiment.

FIG. 9 shows the entire configuration of the image processing apparatus 100A according to the second embodiment of the invention. FIG. 10 shows the functional block diagram of the main portion of the image processing apparatus 100A. In FIGS. 9 and 10, portions corresponding to those of FIGS. 1 and 2 are marked with the same symbols.

In FIG. 9, the image processing apparatus 100A according to the second embodiment includes the image input device 101 mounting the automatic document feeder, the arithmetic operation device (CPU) 102 for executing the various kinds of image processing, the character recognition processing and other necessary processing, the storage device 103 for temporarily storing the image information inputted at the image input device 101, the programs necessary for the execution and the processing results, and the information output device 104 for outputting the processing results. Further, the image processing apparatus of this embodiment includes an information display device 105 and a pointing device 106. Furthermore, the storage device 103 stores a morphological analysis unit and a word dictionary. The second embodiment obtains the character recognition result for each image based on the character image information stored in the character image management data.

In FIG. 10, the image processing apparatus 100A is configured to include not only the page image input part 10, the page image storage part 11, the character image segmentation part 12, the character image classifying part 13, the character image storage part 14, the average character image characteristic obtaining part 15, the character recognition part 16, the corresponding part 17, the correspondence storage part 18 and the recognition result output part 19 but also a morphological analysis part 20, a word dictionary 21 and a recognition result correcting part 22, etc.

Figure 12:
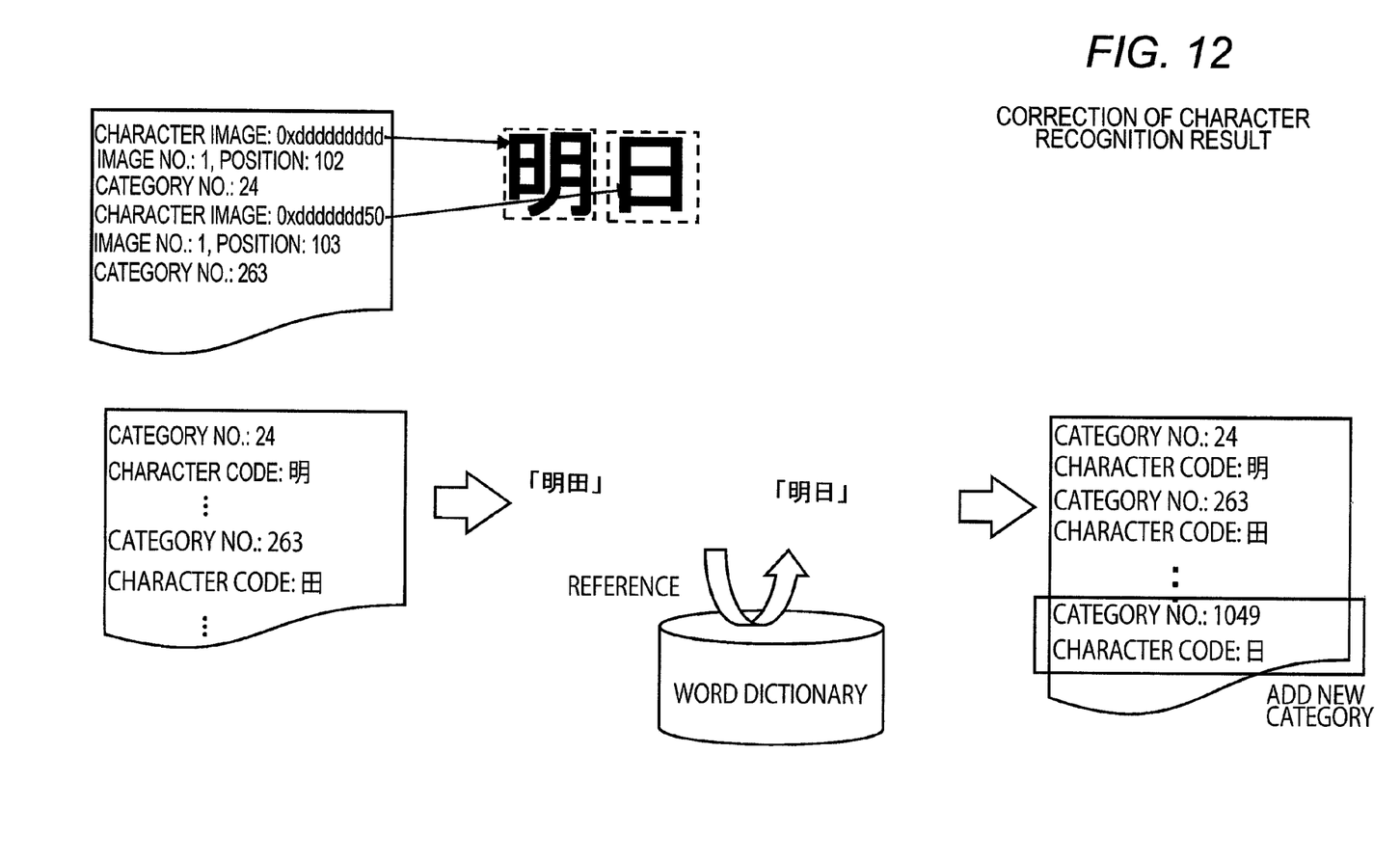
FIG. 12 is a diagram for explaining the automatic correction of the character recognition result of the second embodiment.

When the classification of a segmentation character image is erroneous, there exists a category in which different characters are mixed. To this end, in this embodiment, the morphological analysis part 20 subjects the character recognition result to the morphological analysis processing with reference to the word dictionary 21 to extract a word, and replaces the extracted word by a most similar word in the case of a character sequence not conforming to the word dictionary. In this case, although the character is changed, a new category is provided as to the corresponding new character and registered in the category storage part 13A to thereby update the corresponding relation between the category and the character code (FIG. 12). For example, in the case of FIG. 12, since the character sequence "明日(these Chinese characters mean "tomorrow" in English)" is erroneously recognized as "明田(these Chinese characters do not have predetermined meaning in English)" including "明(this Chinese character means "clarity" in English)" and "田(this Chinese character means "rice field" in English)", it is determined that "田"is to be corrected to "日(this Chinese character means "day" in English)". Thus, a new category identifier is allocated to the corresponding character image (0xdddddddd50), then a category is generated which representative image (template) is the character image (0xdddddddd50), and a pair of the character code of "日"and the new category identifier is added to the character image management data.

Next, the correction operation by a user will be explained. In this embodiment, an input image and the recognition result thereof are displayed on the information display device 105 and the recognition result correcting part 22 corrects the recognition result. A user indicates an erroneous character by using the pointing device 106 such as a mouse and inputs a correct character. In this case, the correct character may be inputted via a key board etc. or may be selected from a list of the candidate characters of character recognition. In this case, the category of the indicated character is determined based on the position information of the character indicated as an error. The item of the character code of the character image management data is corrected based on the corrected character information. The display information is updated based on the character image management data, whereby erroneous recognition can be corrected as to all the input images.

Figure 11:
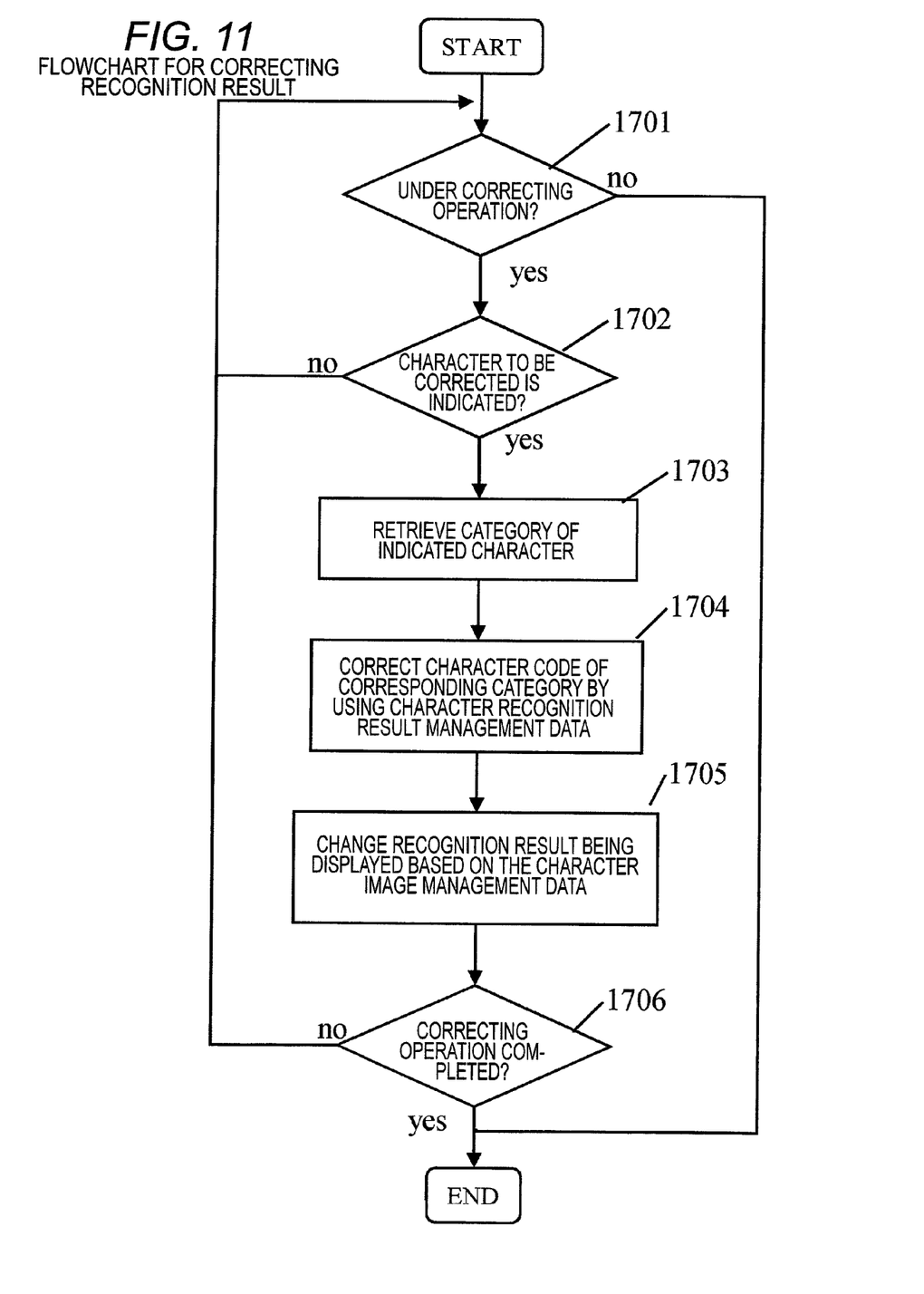
FIG. 11 is a flowchart for explaining an example of the operation of the second embodiment.
Figure 13:
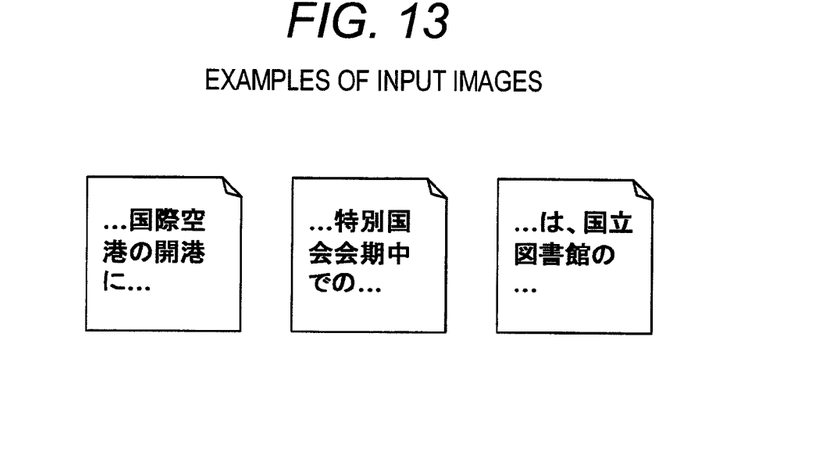
FIG. 13 is a diagram showing an example of input images for explaining the correction of the character recognition result by a user in the second embodiment.
Figure 14:
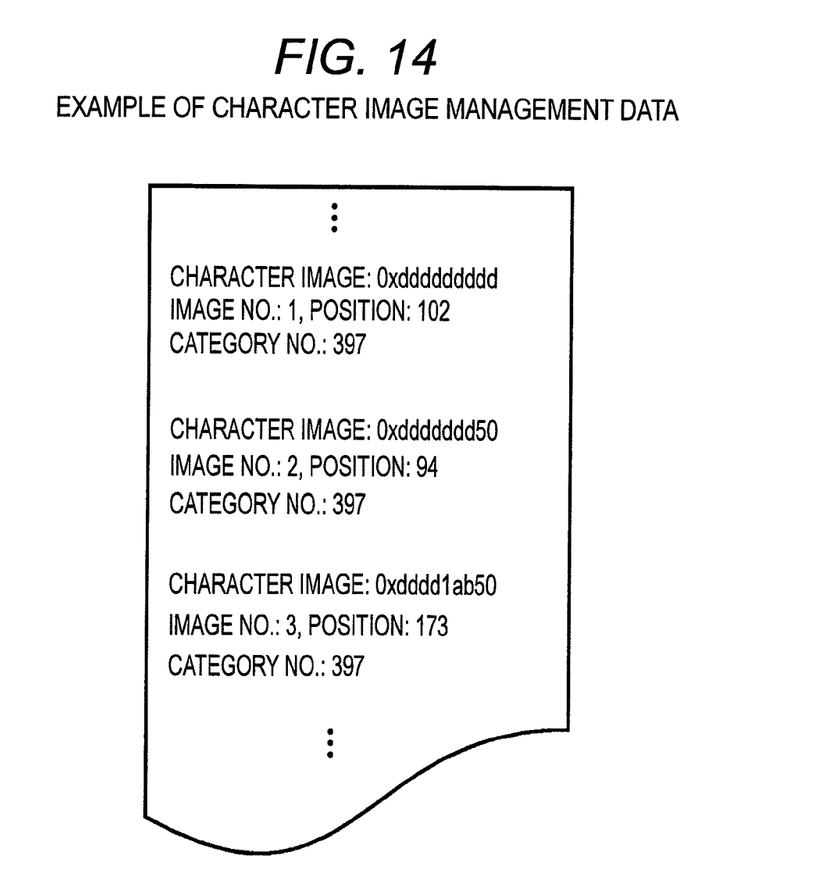
FIG. 14 is a diagram showing an example of the character image management data for explaining the correction of the character recognition result by a user in the second embodiment.
Figure 15:
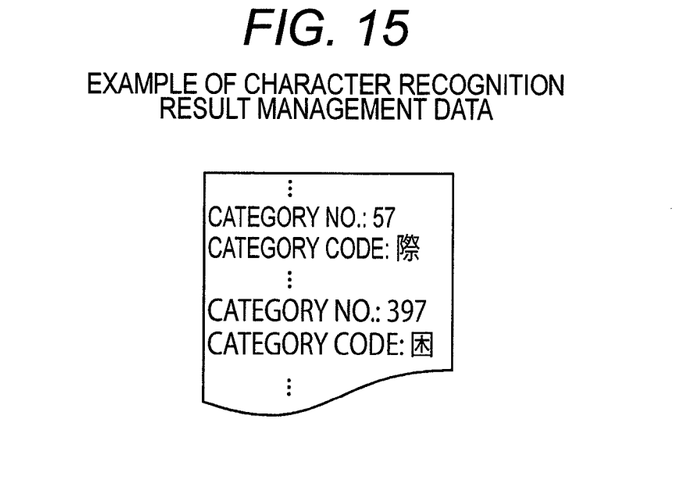
FIG. 15 is a diagram showing an example of the character recognition result management data for explaining the correction of the character recognition result by a user in the second embodiment.
Figure 16:
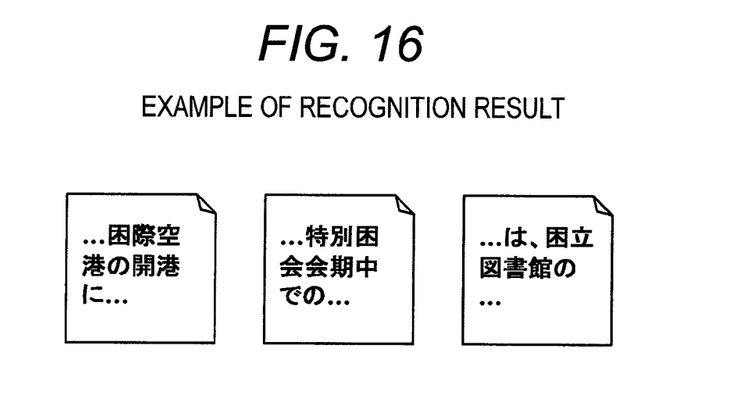
FIG. 16 is a diagram showing an example of the recognition result for explaining the correction of the character recognition result by a user in the second embodiment.
Figure 17:
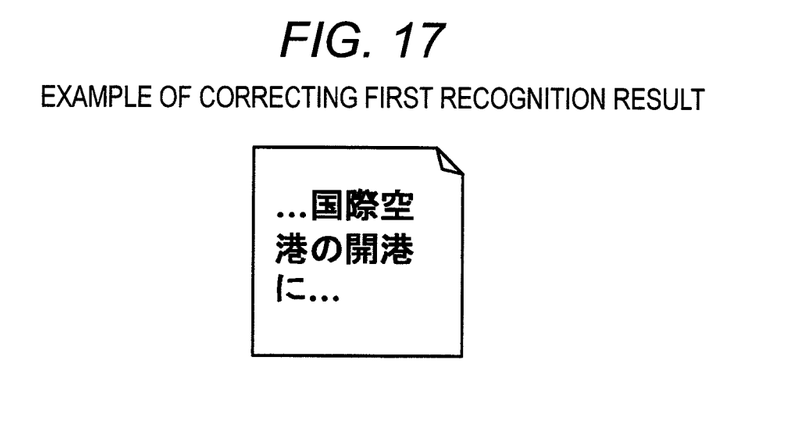
FIG. 17 is a diagram showing an example of the first correction for explaining the correction of the character recognition result by a user in the second embodiment.
Figure 18:
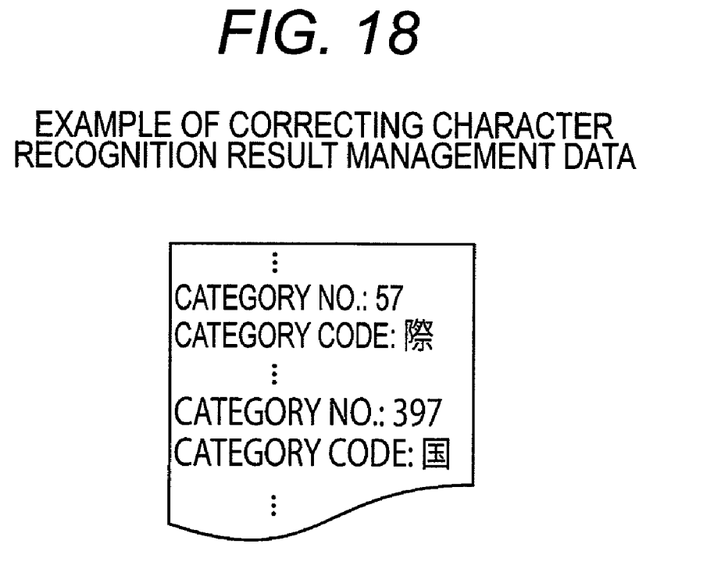
FIG. 18 is a diagram showing an example of the correction of the character recognition result management data for explaining the correction of the character recognition result by a user in the second embodiment.
Figure 19:
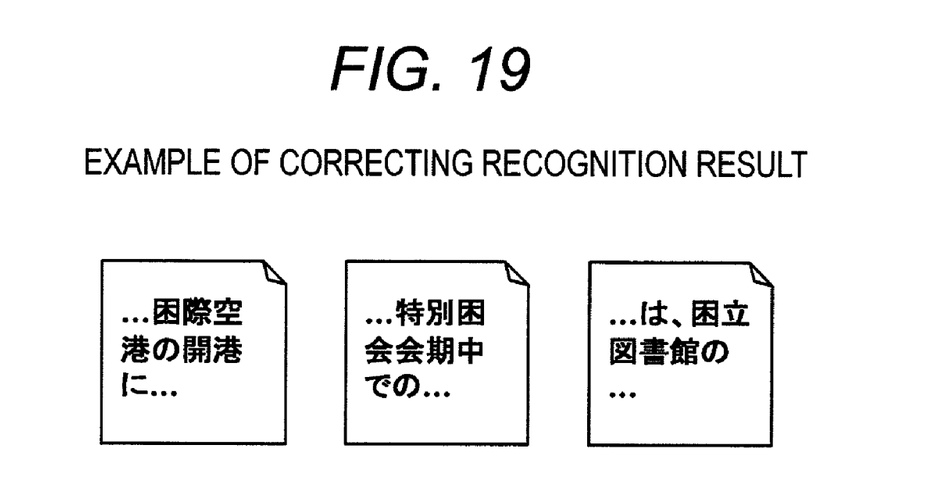
FIG. 19 is a diagram showing an example of the final correction result for explaining the correction of the character recognition result by a user in the second embodiment.

The concrete processing will be explained with reference to drawings. FIG. 11 shows a flowchart of the correction processing. It is supposed that three images shown in FIG. 13 are inputted and subjected to the recognition processing, and so character image management data shown in FIG. 14 and character recognition result management data shown in FIG. 15 are obtained. As a result, the character code "困(this Chinese character means "confusion" in English)" is allocated to the character category 397 and so the character to be originally recognized as "国(this Chinese character means "country" in English)" is erroneously recognized as "困"in each of the images as shown in FIG. 16. With respect to this recognition result, a user indicates the character "困"in the recognition result of the first page by using the pointing device 106 etc. in the information display device 105 (1701, 1702) and corrects this character into "国"(FIG. 17). The character image management data (position information) is retrieved based on the indicated information and the character category corresponding to the indicated character is determined (1703). Next, as shown in FIG. 18, the character code of the corresponding character category is corrected to the character "国"(1704). Then, the recognition result is updated based on the character image management data by using the corrected character recognition result management data (1705). Thus, the similar correction is reflected on the remaining two images and so the correction is made as to all the images as shown in FIG. 19.

Next, other principal embodiment of the invention will be explained. Of course, the invention is not limited to this embodiment. According to the principal embodiment, character images are segmented from all document images inputted via the image input device, and the character images thus segmented are classified. The character images thus classified are averaged for each classification to generate images, and the averaged images are subjected to the character recognition processing. In order to obtain an averaged image from a plurality of correction images, it is intended to reduce the distortion etc. of each of the correction images to thereby improve the recognition rate. The character recognition result, the character image group corresponding thereto and the position information of the respective character images are stored. When a character is corrected as to the document image of one page, the character image group containing a character image corresponding to the corrected position is retrieved and the correction of the character is performed as to the character image group thus retrieved.

In this manner, when one character is corrected, the same character within all inputted document images can be corrected collectively. Since an image is not classified based on a character recognition code, one character code can be allocated uniquely to the same character (an image printed in the same manner). Thus, it can be guaranteed that the same character code is outputted as to the same character as to all document images.

The invention is to be determined based on the description of claims and hence is not limited to the concrete configuration, object and effects of the embodiments. The invention is not limited to the aforesaid embodiments and so can be modified in various manner without departing from the gist thereof.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A document processing apparatus comprising:
 a processor that functions as a character segmentation unit that segments a plurality of character images from a document image;
 a character image classifying unit that classifies the plurality of character images to categories corresponding to each of the plurality of character images;
 an average character image obtaining unit that obtains average character images for each of the categories of the plurality of character images classified by the character image classifying unit;
 a character recognizing unit that performs a character recognition to character images classified into the categories using the average character images of the categories;
 an output unit that outputs character discriminating information as a character recognition result obtained by the character recognizing unit; and
 a correcting unit that corrects the character discriminating information of a character image among the plurality of character images,
 wherein the correcting unit includes a dictionary including a plurality of morphemes, and performs a morphological analysis to extract a morpheme from the character discriminating information of the character, and the correcting unit, in a case where there is no morpheme in the dictionary corresponding to the extracted morpheme, generates a new category, classifies the character image to the new category in the character discriminating information of the character image.

2. The document processing apparatus as claimed in claim 1, wherein the correcting unit, in a case where the character discriminating information allocated to one of the plurality of character images is corrected, reflects the correction on other of the plurality of character images contained in the category to which the one of the plurality of character images belongs.

3. The document processing apparatus as claimed in claim 2, further comprising a corresponding unit that corresponds each of the categories corresponding to the plurality of character images with the character recognition result obtained by the character recognizing unit,
 wherein the output unit outputs the character recognition result, which is corresponded with the category by the corresponding unit, as the character discriminating information allocated to the one of the plurality of character images, and the correcting unit, in a case where the character discriminating information allocated to the one of the plurality of character images is corrected, corrects a correspondence relationship obtained by the corresponding unit to reflect the correction on other of the plurality of character images contained in the category to which the one of the plurality of character images belongs.

4. The document processing apparatus as claimed in claim 1, further comprising:
a document image input unit that includes an automatic document feeder that receives documents of the document image; and
a character image management unit that stores:
(1) information representing sheet numbers of the documents, from which the plurality of character images are segmented, respectively, among the documents received by the automatic document feeder;
(2) coordinates of the plurality of character images;
(3) the plurality of character images; and
(4) information of the categories to which the plurality of character images are classified.

5. The document processing apparatus as claimed in claim 1, wherein the average character image obtaining unit averages pixel values of all the plurality of character images belonging to a same category at each of pixel positions, and obtains the average character image by using the average values of the pixel values at each of the pixel positions.

6. The document processing apparatus as claimed in claim 1, wherein the average character image obtaining unit obtains characteristic values from all the plurality of character images belonging to a same category, and obtains the average character image characteristics based on an average value of the characteristic values.

7. The document processing apparatus as claimed in claim 1, further comprising a character recognition result storage that stores the character discriminating information as the character recognition result obtained by the character recognizing unit.

8. A document processing method comprising:
segmenting a plurality of character images from a document image;
classifying the plurality of character images to categories corresponding to each of the plurality of character images;
obtaining average character images for each of the categories of the classified plurality of character images;
performing a character recognition to character images classified into the categories using the average character images;
outputting character discriminating information as a character recognition result; and
correcting the character discriminating information of a character image among the plurality of character images using a dictionary including a plurality of morphemes, performing a morphological analysis to extract a morpheme from the character discriminating information of the character, and, in a case where there is no morpheme in the dictionary corresponding to the extracted morpheme, generating a new category, classifying the character image to the new category in the character discriminating information of the character image.

9. A non-transitory computer readable medium storing a program causing a computer to execute a process for performing document processing, the process comprising:
segmenting a plurality of character images from a document image;
classifying the plurality of character images to categories corresponding to each of the plurality of character images;
obtaining average character images for each of the categories of the classified plurality of character images;
performing a character recognition to character images classified into the categories using the average character images;
outputting character discriminating information as a character recognition result; and
correcting the character discriminating information of a character image among the plurality of character images using a dictionary including a plurality of morphemes, performing a morphological analysis to extract a morpheme from the character discriminating information of the character, and, in a case where there is no morpheme in the dictionary corresponding to the extracted morpheme, generating a new category, classifying the character image to the new category in the character discriminating information of the character image.

10. A document processing apparatus comprising:
a memory; and
a processor, wherein the processor functions as:
a character segmentation unit that segments a first character image and a second character image from a document image and records first image management data of the first character image and second image management data of the second character image in the memory,
wherein the first image management data comprises:
the first character image;
a first position of the first character image in the document image; and
a first category identifier that identifies a first category into which the first character image is classified, and
wherein the second image management data comprises:
the second character image;
a second position of the second character image in the document image; and
a second category identifier that identifies a second category into which the second character image is classified;
a character image classifying unit that classifies the first character image and the second character image to a category, and sets the first category identifier and the second category identifier stored in the memory to a category identifier that identifies the category;
an average character image obtaining unit that obtains an average character image of the category as an average of the first character image and the second character image classified into the category;
a character recognizing unit that performs a character recognition of the average character image, and records character recognition result management data in the memory, the character recognition result management data comprising the category identifier and a character code that identifies a recognized character of the category that is a result of the character recognition; and
a correcting unit that corrects a selected character image that is one of the first character image and the second character image, the correcting unit comprising a dictionary that includes a plurality of morphemes,
wherein the correcting unit performs a morphological analysis to extract a morpheme from the selected character image using one of the first image management data and the second image management data corresponding to the selected character, determines that the extracted morpheme does not exist among the plurality of morphemes, generates a new category identifier, records the new category identifier in the result management data in the memory, associates the new category identifier with the selected character image, and sets one of the first category identifier and the second category identifier in the one of the first image management data and the second image management data corresponding to the selected character to the new category identifier.

* * * * *